Jan. 18, 1966 E. R. BALLINGER ETAL 3,230,369
RADIATION DOSIMETER SYSTEM USING
CADMIUM-BACKED COPPER FOIL
Filed Sept. 11, 1962 5 Sheets-Sheet 1

INVENTORS
Edwin R. Ballinger, Leo J. Carr,
Payne S. Harris,
Richard D. Hiebert, John H. Larkins.

INVENTORS
Edwin W. Ballinger, Leo J. Carr,
Payne S. Harris,
Richard D. Hiebert, John H. Larkins INVENTORS
Edwin R. Ballinger, Leo J. Carr,
Payne S. Harris,
Richard D. Hiebert, John H. Larkins Jan. 18, 1966    E. R. BALLINGER ETAL    3,230,369
RADIATION DOSIMETER SYSTEM USING
CADMIUM-BACKED COPPER FOIL Filed Sept. 11, 1962    5 Sheets-Sheet 5

INVENTOR.
Edwin R. Ballinger, Leo J. Carr, Payne S. Harris,
Richard D. Hiebert, John H. Larkins
BY

United States Patent Office 3,230,369
Patented Jan. 18, 1966

3,230,369
RADIATION DOSIMETER SYSTEM USING
CADMIUM-BACKED COPPER FOIL
Edwin R. Ballinger, Los Alamos, Payne S. Harris,
Santa Fe, Richard D. Hiebert and Leo J. Carr, Los
Alamos, and John H. Larkins, Santa Fe, N. Mex.,
assignors to the United States of America as represented by the United States Atomic Energy Commission
Filed Sept. 11, 1962, Ser. No. 222,976
4 Claims. (Cl. 250—83.1)

This invention relates to a dosimeter system and more particularly to a method for determining the neutron dose received by human beings from radiation incidents.

Does of radiation sufficient to cause death within weeks may not produce symptoms in human beings for many hours after exposure to the radiation. Furthermore, the accurateness, severity, and type of symptomatology are not always of prognostic value. Adequate personnel dosimetry is, therefore, a requisite when early mass casualty assessment is required such as in military and civilian defense applications. Since nuclear weapon and reactor explosions and criticalities involve the radiation of neutrons and gamma rays, both of which are capable of producing injury in humans, a dosimeter system for mass casualty assessment must be capable of measuring both gamma and neutron doses in the characteristic mixed radiation field.

Gamma dosimeters for this purpose are in a much more refined state of the art than either the neutron or gamma-neutron dosimeters.

There has been recent recognition of the value of body sodium activation measurements in assessing a received neutron dose. One device accomplishes such measurements by use of a well type scintillation counter which involves the drawing, centrifugation, and counting of blood serum samples for $Na^{24}$ activity. Another method is the use of the human whole-body counter and also by the use of a large scintillation crystal gamma spectrometer assembly. All of these devices have inherent disadvantages for mass casualty assessment work in the field, such as lack of portability, time consuming testing procedures, high level of training necessary for operators as well as relative expense of the system. For mass casualty assessment work, a dosimeter system should be portable, relatively inexpensive, and capable of rapid and fairly untrained operation.

It is, therefore, an object of the present invention to provide a dosimeter system for determining neutron dosage received by human beings exposed to radiation incidents.

It is another object of the present invention to provide a portable dosimeter system for determining the neutron dosage received by human beings exposed to radiation incidents.

It is still another object of the present invention to provide a rapidly operable dosimeter system for determining neutron dosage received by human beings exposed to radiation incidents.

It is a further object of the present invention to provide a dosimeter system for measuring the neutron dosage received by human beings from a mixed radiation field.

It is a still further object of the present invention to provide a method for measuring the neutron dose received by a human being from a radiation incident by measurement of body sodium.

It is yet a further object of the present invention to provide a method of determining the statistical average neutron energy of the incident dose received by a human being.

It is a further object of the invention to provide a neutron dosimetry system which directly measures human body and clothing induced radiation and which does not require the attachment of badges or other forms of dosimeters to the clothing.

It is yet another object of the invention to provide, by electronic circuitry, a means of estimating body sodium activity at the time of exposure without resorting to tables or calculations.

Other objects and a fuller understanding of the invention may be had by referring to the following description and claims taken in conjunction with the accompanying drawings in which:

Figure 5A:
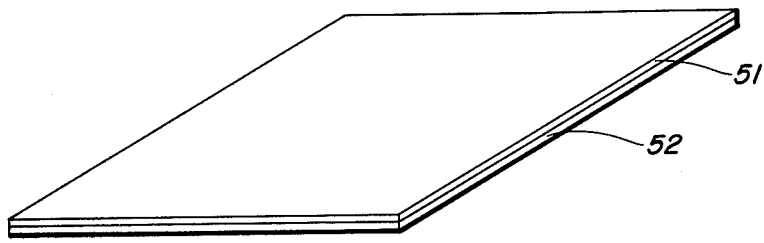
Figure 5B:
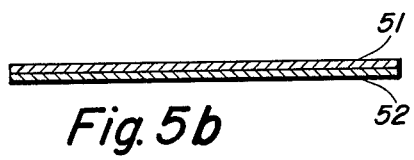
Figure 5C:
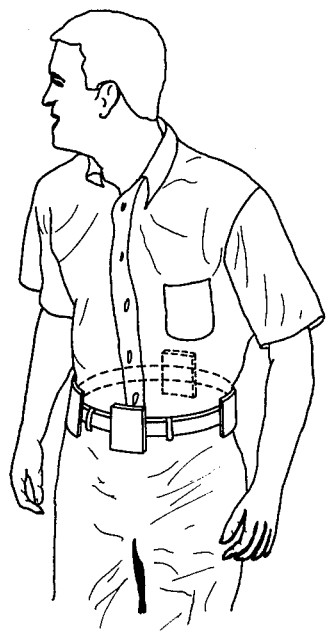

FIGURE 5 shows three views (a, b, and c) of the cadmium-backed copper foil badge of this invention. FIGURE 5a is a three-quarter sectional view of the foil badge, while FIGURE 5b is a cross-sectional view. FIGURE 5c is an illustration of a human being wearing four of the badges at cardinal (NSEW) points in a belt.

The novel method of the present invention to determine the neutron dose received by an individual is based upon the measurement of induced body sodium activity and the relation of the ratio of body sodium activity to the activity of a copper foil worn on or about the body as a function of incident neutron energy which permits an estimate of body dose to be made.

The principles underlying the present invention may be stated as follows:

(1) The amount of damage (tissue dose) produced in the body depends upon the number and energy of the incident neutrons.

(2) The activation of body sodium-23 to radioactive sodium-24 depends upon the number and energy of the incident neutrons.

(3) The activation of a copper foil worn on the body to radioactive copper-64 depends upon the number and energy of the incident neutrons.

(4) Sodium-24 decays with a 14.8 hour half life emitting gamma rays that can be detected by holding a rate meter-probe assembly against the back of the individual exposed.

(5) Copper-64 decays with a 12.8 hour half life emitting gamma rays that can be detected by placing the copper foil on a rate meter-probe assembly.

(6) Tissue dose, body sodium activity, and copper foil activity increase directly and proportionally with the number of incident neutrons.

(7) Both tissue dose and body sodium activity increase with increasing neutron energy; however, the increases are not proportional to neutron energy and neither do they increase to the same amount nor at the same rate with increasing neutron energy.

(8) The activity of a copper foil worn on the body decreases with increased neutron energy; however, the decrease is not inversely proportional to the neutron energy except over a small range.

(9) The ratio of body sodium activity to copper foil activity is characteristic of a certain average incident neutron energy.

(10) In order to determine the tissue dose both the sodium activity produced and the average incident neutron energy which produced it must be known.

The present invention measures the body sodium activity by means of a special rate meter-probe assembly held against the back of the exposed individual.

The present invention provides an estimate of average neutron energy by comparing the observed body sodium activity with the activity of a copper foil worn on the body. The ratio of these two activities as a function of neutron energy has been experimentally and theoretically determined by the inventors of the present invention.

Figure 3:
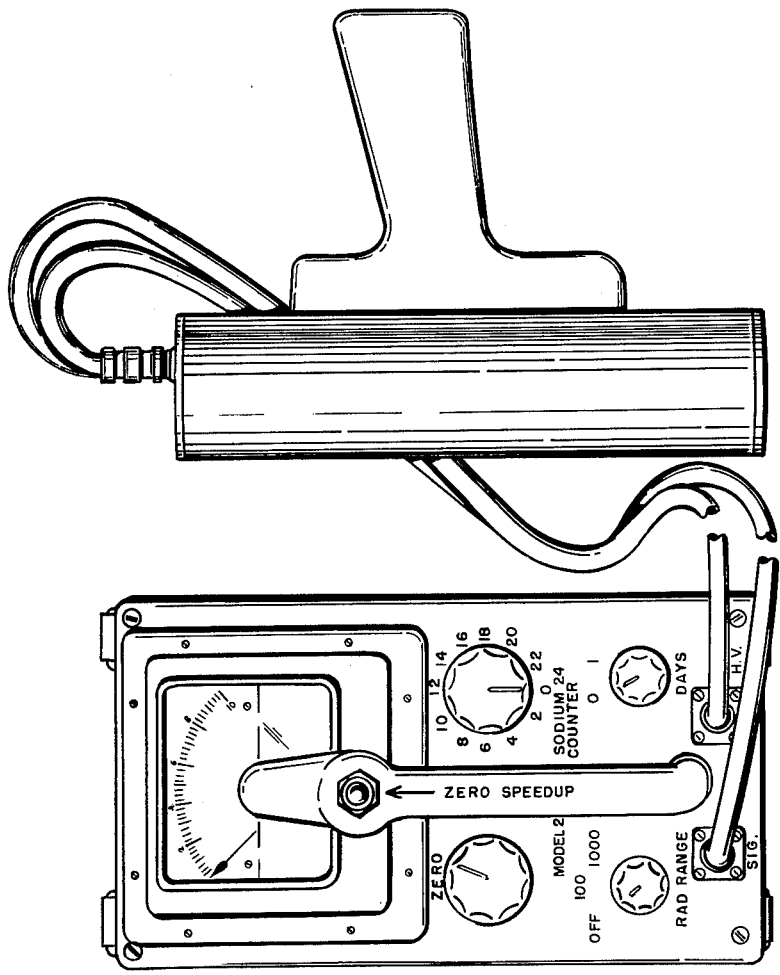
FIGURE 3 is a drawing of the battery operated $Na^{24}$ detector unit.

A device in accordance with the present invention is shown in FIGURE 3. The device is physically in two parts, a detector probe and a rate meter box.

Figure 1:
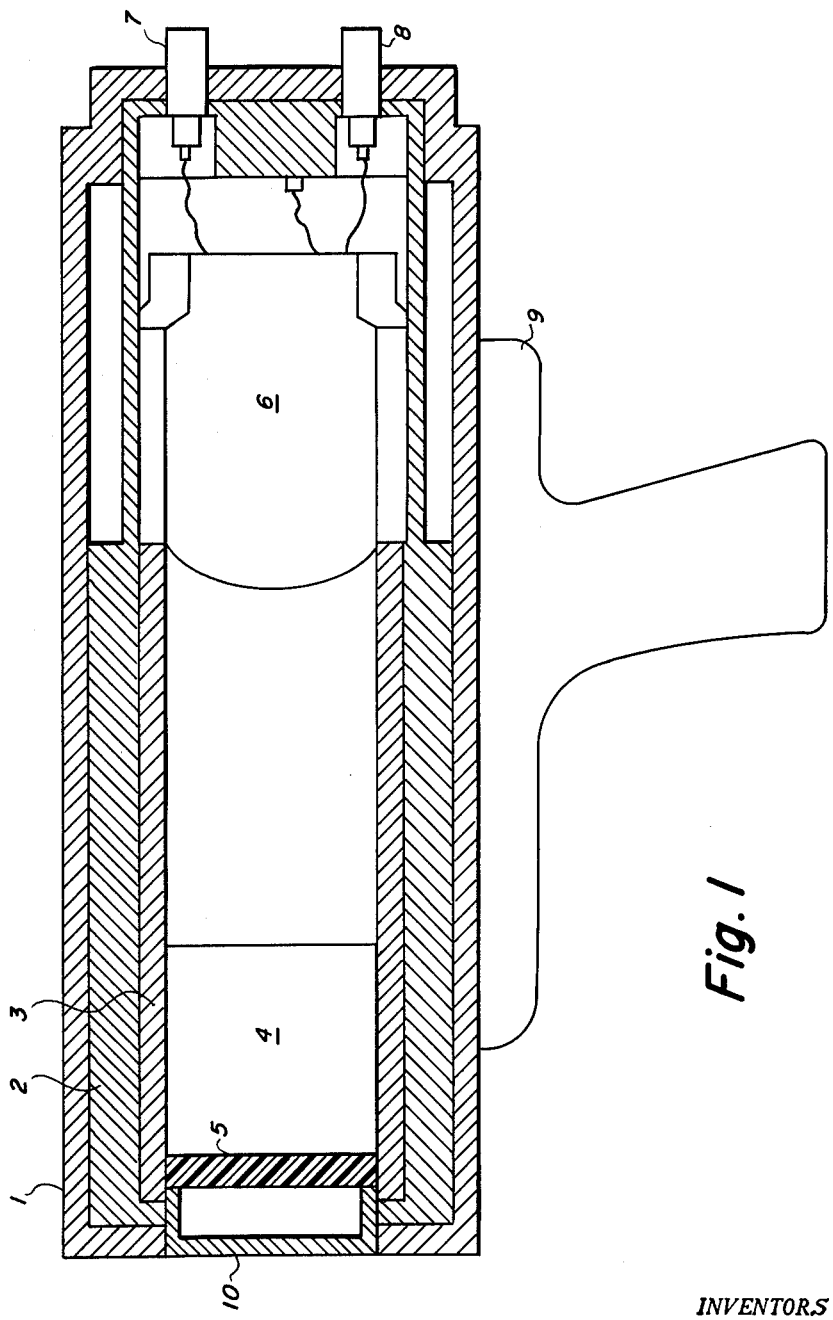
FIGURE 1 shows an elevation view, partially in cross section, of the body sodium activity detector unit utilized in the method of the present invention.

The detector probe is shown in FIGURE 1 and consists of a NaI crystal 4 mounted on a photomultiplier tube 6 wrapped with conetic material 3 to reduce local environmental magnetic effects and with lead 2 to reduce environmental radiation background effects. This unit is encased in aluminum 1, capped at both ends (10 and 1), and equipped with a piston grip handle 9 for convenience of operation. In operation, the detector probe unit is held firmly against the body of the individual to be checked, preferably over the lumbar area where the adjacent rich blood supply and heavy bone structure insures a high concentration of body sodium. The gamma radiation from the decaying body sodium-24 produces light pulses in the NaI crystal in proportion to the activity observed. The light pulses are detected and amplified as electrical pulses in passage through the photomultiplier tube.

Figure 2:
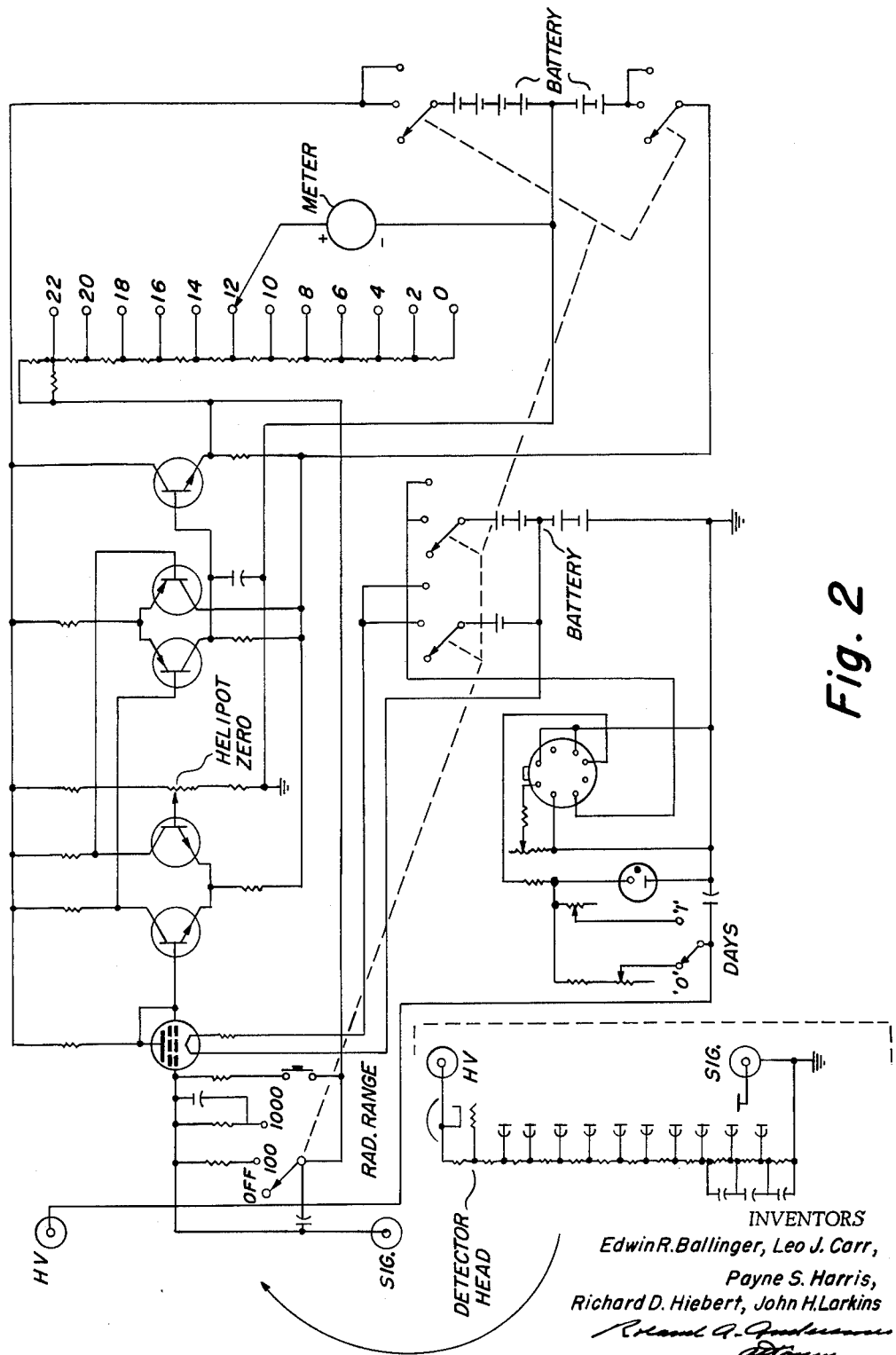
FIGURE 2 is a schematic diagram, partially in block form, of the rate meter circuitry used in conjunction with the detector unit of FIG. 1.

The photomultiplier tube output is fed by coaxial cable 7, FIGURE 1, to the rate meter box where the signal is further amplified in the circuitry shown in FIGURE 2. The amplified signal passes then to a microammeter which has been calibrated in rads of incident neutrons of 2 mev. energy required to produce the $Na^{24}$ activity observed. Detailed descriptions of the components of the rate meter box shown in FIGURE 2 are as follows:

(1) A power supply unit of a compact self contained type for portable operation supplies the necessary operating voltages for both the rate meter box components and the photomultiplier tube in the detector unit 8, FIGURE 1.

(2) Rate meter circuitry is divided into three main stages: A combination input-amplifying stage; an amplifying stage; and a combination amplifier-output stage.

Any well known amplifying stage circuitry can be utilized; however, the use of transistorized circuitry is preferred to minimize power and space requirements and provide a compact and portable unit. The signal output from the photomultiplier tube is conducted through a coaxial cable shown in FIGURE 3 to a coaxial input socket on the meter box unit, and thence to the first input amplifying stage. The signal is further amplified in the remaining two stages and is then presented to a load consisting of the series combination of a current-limiting tapped resistance network and finally to the microammeter. The amount of output current passing through the microammeter varies in accordance with the input signal derived from the sodium activity of the individual examined by the detector probe unit.

(3) Decay correction circuitry: To allow the correction of readings taken longer than 22 hours post exposure a series of voltage dropping resistors can be selectively switched to regulate the high voltage output to the photomultiplier tube. The value of these voltage dropping resistors is such as to provide 24 hour increments of logarithmic decay which would thereby, in combination with the tapped resistance network (shown in FIGURE 2), allow correction in 2 hour increments of meter readings obtained a matter of days after exposure. Full scale readings of 100 rads and 1000 rads have been found convenient and are selectable by a front panel switch which inserts different values of amplifier input resistors (see FIGURE 3).

To obtain an accurate indication of the neutron dosage received by the human body upon exposure to nuclear radiation a body activity reading taken some time after exposure must be related back to the time of exposure because the radioactivity of the body has been logarithmically decaying. The correction is accomplished electrically in the rate meter circuit by the tapped resistance network, the time since exposure being "dialed-in" by the operator. The relative values of the resistances between the taps of the network are selected to cause a logarithmic decrease in effective resistance, upon the successive selection of taps, in accordance with the logarithmic rate of decay of sodium-24. Since the half life of sodium-24 is known to be 14.8 hours, selection of the actual values of resistances between taps is relatively simple once the equivalent full scale indication in rads per hour has been specified. In the device, 12 taps are provided with the equivalent time between taps equal to 2 hours (see FIGURE 2). Hence, the operator may dial in the time since exposure in bihourly increments up to 22 hours and the meter reading will automatically be corrected to directly read the radiation absorbed by the human body.

(4) Background zero adjust circuitry: An additional circuit refinement is the inclusion of an adjustable voltage divider network in the amplifying stage to enable the canceling out of reasonable background radiation levels. In practice an attenuation plug, having attenuation characteristics identical to that of the human body would, preliminary to readings, be placed over the end of the detector unit and a reading taken in free air. Any meter indication could then be zeroed out by proper adjustment of the amplifying stage voltage dividing network.

As pointed out in item (10) of "principles underlying the present invention," in order to determine the tissue dose it is necessary to known both the body sodium-24 activity and the average neutron energy. The present invention has been deliberately calibrated to read the actual tissue dose received from approximately 2 mev. neutrons. If the average neutron energy is less than 2 mev., the microammeter on the rate meter box will read a larger dose than actually received by the individual. Conversely, if the average incident neutron energy is greater than approximately 2 mev., the reading will understate the actual dose received.

Figure 4:
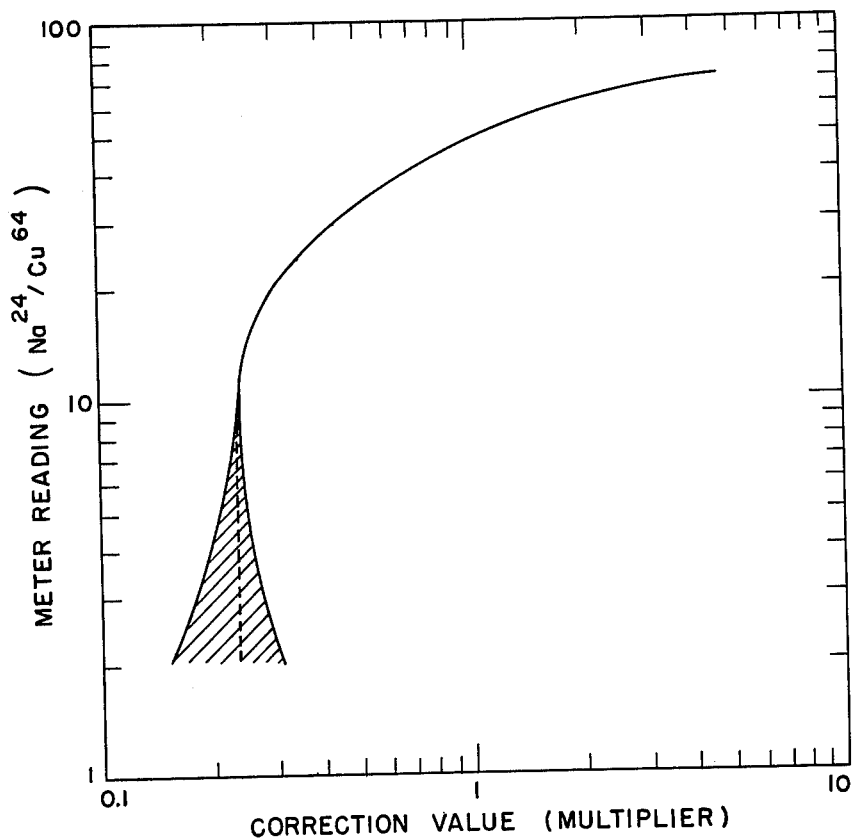
FIGURE 4 is a graph indicating the correction value to be applied to the microammeter reading vs. Na/Cu ratio.

As pointed out in item (9) of "principles underlying the present invention," the ratio body sodium-24 activity to the activity of a copper foil worn on the body is characteristic of a certain incident neutron energy. The relation of these ratios vs. neutron energy was determined theoretically and checked experimentally. Similarly, the relation between body sodium-24 activity and neutron energy was determined. Thus, by obtaining the ratio of activities $$\left(\frac{\text{body Na-24}}{\text{copper foil}}\right)$$

the corresponding average neutron energy is obtained, and by knowing the relation between body sodium-24 activity and neutron energy, the microammeter reading can be corrected accordingly to approximate the actual dose received. The correction values vs. Na/Cu ratio are indicated in FIGURE 4. Several features of the copper foils need to be stated.

The copper foils (see FIGURE 5a and b) used in the present invention measure ¾" x ¾" x 30 mil thick. The foils are backed with cadmium 52 measuring ¾" x ¾" x 30 mil thick. Cadmium is necessary to prevent neutrons scattered and reflected from the body from coming in contact with the copper foil 51 and thus contributing to the activation produced by incident neutrons from the radiation source. Four foils are worn at cardinal compass points (see FIGURE 5c) in clothing at the waistline of the individual to insure that at least one of the four copper foils will be directly exposed to the source of the radiation. In practice, these foils may be sewn into clothing belts (FIGURE 5c) worn by the individuals.

To render the method of the present invention usable for mass casualty assessment following a known or suspected radiation incident, it is assumed that the individuals to be examined will be wearing the four foil belt referenced previously.

The proposed procedure is as follows:

(1) The device is turned on, the time since suspected exposure dialed in, and the environmental background level zeroed out.

(2) Screening: Since the microammeter reading will be high if the average neutron energy is less than 2 mev. and since this probability is great, one would first perform a screening procedure by placing the probe over the lumber area of all individuals in rapid succession and eliminating from further consideraion all persons with readings less than 25 rad. This procedure may early indicate the number of probable neutron radiation casualties and such a procedure can be conducted at a rate of 4–6 persons/minute.

(3) Dose estimates: All individuals with screening readings greater than 25 rad having been assembled, the device is turned on and a favorable location for readings is determined by walking about the area to determine a spot with the lowest background reading. The attenuation plug having background attenuation characteristics comparable to that of a human body would be held over the detector unit and the microammeter adjusted to a zero needle reading by means of the zero adjust knob. The probe is then held over the lumber area of the back for 5–10 seconds or for long enough for the microammeter needle to come to rest. The reading is recorded and the copper foil belt is scanned for the foil with the highest relative activity. This foil will be the one which faced the radiation source and the orientation will be recorded. The microammeter needle will again be zeroed, this time without the attenuation plug and the most active copper foil will be removed from the clothing and placed on the face of the detector probe. The activity will be recorded and the ratio of the two readings determined $$\left(\frac{\text{body Na-24}}{\text{copper foil}}\right)$$

Using the graph shown as FIGURE 4, a correction value will be obtained. This value, when multiplied by the body sodium reading will result in an approximation of the actual neutron dose received. This procedure of dose estimate can be conducted with a two man survey team (reader and recorder) at a rate of 1 estimate per 2 minutes.

A specific example of the aforementioned procedure is as follows: A dummy man with neutron response characteristics similar to a real man is exposed to radiation for four hours, the necessary time correction is dialed in on the counter-reader and a reading of 100 rads is obtained. A copper foil belt worn by the dummy man is then scanned by the counter probe and a reading of 4 rads is obtained. The sodium-24 to copper-24 ratio is 100 to 4 or 25. Looking at FIGURE 4 and reading across to where the sodium/copper value of 25 intersects the curve, a correction value of 0.38 is obtained. This correction value is multiplied by the 100 rads figure, which gives a resulting value of 38 rads. This measurement is the approximate true neutron radiation dose which the dummy has received. By a different and much more time consuming method called the Hurst Fission Foil System, a value of 45 rads was obtained, thus giving the applicants' measuring system an error of about 15%.

What is claimed is:

1. An improved dosimeter system having in combination means for indicating substantially the average radiation dose received by a human being within 48 hours of a radiation incident due to neutrons of various energies released during the said incident, said combination comprising a portable battery powered sodium-24 - copper-64 detector unit and a thin cadmium-backed copper foil placed strategically in the clothing of the said human being.

2. The dosimeter system of claim 1 in which said detector unit is comprised of a probe, an electronic means for adjusting the gamma radiation sensitivity of the said probe, and an electronic means for adjusting the gamma radiation signal of the detector so as to make the value of the signal time dependent.

3. The dosimeter system of claim 1 in which four cadmium-backed copper foils are worn at cardinal points at the waistline of the individual, said foils being each comprised of a copper plate of the dimensions three-quarters inch by three-quarters inch by 0.003 inch and being backed by a cadmium plate of the same dimensions.

4. The dosimeter system of claim 1 in which said detector unit is comprised of
   (a) a probe that consists of a sodium iodide crystal mounted on a photomultiplier tube,
   (b) said tube being wrapped with a conetic material and lead,
   (c) said unit being encased in alminum and having a pistol grip handle, and
   (d) said photomultplier tube being electrically connected to a meter box where the signal is further amplified and measured by a microammeter calibrated in rads.

References Cited by the Examiner
UNITED STATES PATENTS

| | | | |
|---|---|---|---|
| 2,933,605 | 4/1960 | Ross et al. | 250—83.1 |
| 2,938,121 | 5/1960 | Fitzgerald | 250—83.1 |
| 3,053,983 | 9/1962 | Faulkner et al. | 250—83 |
| 3,122,635 | 2/1964 | Ludlum | 250—71.5 |

OTHER REFERENCES

"Photographic Neutron Dosimetry to Date," by Dessauer et al., AECD–2278, 4 pages, declassified September 14, 1948.

RALPH G. NILSON, *Primary Examiner.*

ARCHIE R. BORCHELT, *Examiner.*